United States Patent [19]

Olschewski et al.

[11] 4,099,960
[45] Jul. 11, 1978

[54] METHOD OF SMELTING METALLIC MATERIAL, PARTICULARLY IRON SPONGE

[75] Inventors: Bernd Olschewski, Duisburg; Werner Wenzel, Aachen, both of Germany

[73] Assignee: Demag A.G., Duisburg, Germany

[21] Appl. No.: 801,651

[22] Filed: May 31, 1977

Related U.S. Application Data

[63] Continuation of Ser. No. 658,041, Feb. 13, 1976, abandoned.

[30] Foreign Application Priority Data

Feb. 19, 1975 [DE] Fed. Rep. of Germany ....... 2506926

[51] Int. Cl.² .................................................. C21C 5/52
[52] U.S. Cl. ................................................ 75/11; 75/10 R
[58] Field of Search ............................................. 75/10-12, 75/49

[56] References Cited

U.S. PATENT DOCUMENTS

| | | | |
|---|---|---|---|
| 3,043,895 | 7/1962 | Rohm | 13/27 |
| 3,468,525 | 9/1969 | Kawawa | 75/49 |
| 3,579,324 | 5/1971 | Kennedy | 75/11 |
| 3,676,105 | 7/1972 | McLeod | 75/11 |
| 3,827,877 | 8/1974 | Pantke | 75/12 |

Primary Examiner—P. D. Rosenberg

Attorney, Agent, or Firm—Mandeville and Schweitzer

[57] ABSTRACT

Methods and apparatus are provided for the enhanced production of iron sponge in an induction crucible furnace by reversing the usual flow pattern produced. Upwardly flowing magnetic fields are induced at the furnace walls, causing an upwarding flow of the furnace contents at the walls thereof. This upward flow induces, in turn, a downward flow centrally of the furnace. Thus, ores introduced adjacent the top surface of the furnace contents are impacted immediately by a rapidly moving radial flow pattern toward the furnace axis and drawn immediately downward into the central portions of the furnace. The initial impact causes immediate breakup of the ore to be smelted and the immediate exposure to the central portions of furnace contents causes enhanced comingling with the heated iron bath for enhanced reduction. The lightweight slag produced must pass upwardly in the central portions of the furnace, with the induced down-flow current causing the slag to move more slowly to the surface for a more thorough removal of iron. The upwardly flowing slag forms a hot slag cover centrally of the contents surface. A vertically movable tubular divider maintains and separates the slag centrally of the surface of the furnace contents and provides an annular opening therearound for introduction of fresh charge material. The walls of the furnace are tapered inwardly at the top to cooperate with the divider to increase radial inward movement of the furnace contents at the bath surface.

1 Claim, 1 Drawing Figure

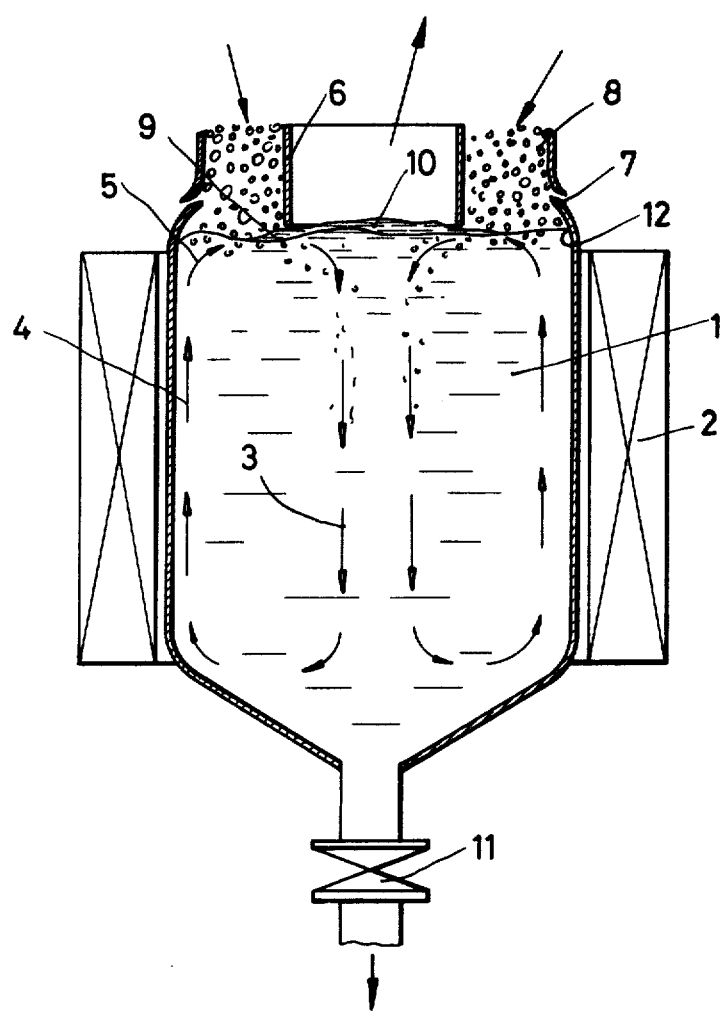

METHOD OF SMELTING METALLIC MATERIAL, PARTICULARLY IRON SPONGE

This is a continuation of application Ser. No. 658,041, filed Feb. 13, 1976, now abandoned.

BACKGROUND AND DESCRIPTION OF THE INVENTION

The invention covers a method of smelting metallic material, particularly iron sponge in an induction crucible furnace which is provided with electric equipment producing zones of rising and descending currents.

The smelting of iron extracted from the ores by reduction below smelting temperature, so-called iron sponge, in an induction crucible furnace has several advantages versus smelting in an electric arc furnace. Such advantages are mainly that the free-forming arc in the arc furnace gives off unfavorable physical effects. Furthermore, the arc furnace uses electrodes which considerably increases the cost of smelting.

For this reason the possibility of using an induction crucible furnace for the smelting of iron sponge has been considered on various occasions. It has been found that in order to obtain a high smelting capacity the greatest possible movement in the bath is required, which is caused by means of inductors producing a travelling magnetic field. A most thorough movement in the bath resulted from the bath current rising in the center of the furnace vessel, whereby a strong dome raises from the bath from which the liquid iron flows toward the crucible walls (Described in the Dissertation of Grumbrecht, Aachen, West Germany 1973, P. 53). The favorable effect of a bath in strong motion is based on the fact that metallic particles from the iron sponge added to the bath surface are carried along and smelted in the depth of the bath (Dissertation of Grumbrecht, P. 85).

It is the object of this invention to get optimum carrying of smelting material in the bath current and optimum smelting of such carried particles of solid iron in the depth of the bath. The solution according to the invention is that the furnace is operated with the currents of the smelt rising near the furnace wall and descending in the furnace center. This results in considerable advantages. If the current of the smelt in the bath surface area is directed from the center towards the wall, the current is broken up by impact on the wall. The separating effect resulting from such impact on the wall is detrimental to the carrying of solid iron particles entering the bath current in the bath surface area, into the depth of the bath in the wall area. Instead, near the wall above the iron bath an area is formed which consists of a conglomerate of liquid slag and non-smelted metal. This area is not subject to inductive effects of electric current and therefore cannot be heated properly. If the smelting process is done continuously so that tapping must be done continuously as well, there will be a risk of withdrawing slag from the furnace which still contains considerable quantities of non-smelted iron.

As per the invention, however, the solid iron sponge particles carried along by the bath current in the surface area from the iron sponge added there, are carried down with the bath current in the center of the furnace. In the depth of the bath they are then smelted and the slag formed in the process, which rises in the bath on account of its light weight, collects in the central area of the bath surface. As the slag must rise against the downward current of the smelt and thus remains longer in the heated iron bath, the slag itself is heated to the temperature of the iron bath and will then form a hot slag cover at the bath surface.

The method as per the invention is best put into effect by adding the material to be smelted near the wall where the current rises in the smelt. It is possible to add the iron sponge in such a manner that the slag remains limited to the central area of the bath surface from where it may be removed without interruption of furnace operation.

An apparatus suitable for the application of the method described above is consequently provided with an inductor producing a rising current in the marginal wall area of the smelt, near the upper furnace opening, and the central area of the bath surface is provided with a means of separating it from the surrounding area.

Basically, this apparatus permits addition of iron sponge in the center of the bath surface. In this case — given the current direction of the liquid iron suggested by the invention from the wall towards the center of the bath surface — the iron sponge is carried directly from the bath center into the depth of the bath and then smelted. The marginal area of the bath surface can thus be kept free of metallic iron, so that slag which is mostly free of iron can be collected there and removed.

The invention suggests the use of a pipe made of fireproof material, such as ceramic material, as means of separation. In order to keep the lower edge of this tube as closely as possible above the bath surface and/or slightly immersed at various heights of the bath level, the separating device must be vertically adjustable. If iron sponge is charged through the pipe in this type of arrangement, no iron sponge can enter the slag cover in the outer area separated from the center, and vice versa.

If smelting material is added to the marginal areas of the smelt with rising current, it would again be advisable to provide the separation device as mentioned. Preferably, the most favorable results are achieved if the inside of the furnace vessel near the upper opening is curved inward and upward. This ensures that the bath current rising in the marginal zone is directed with high intensity to that spot on the bath surface where iron sponge is charged. By giving the cross section of the furnace near the outlet a tapered neck the iron in the lower part of the furnace rising upward near the wall is compressed into a relatively narrow current rising up and accelerating accordingly. The current thus has a high intensity impact on the smelting material floating on top of the bath surface, dissolving it into individual parts which are carried towards the center by the current.

The method as per the invention is of particular advantage when continuously smelting iron sponge. In this case it is best to tap liquid iron either continuously or in small portions through the furnace floor, whereby tapping can be done by means of familiar locks. The slag, however, must be removed from the crucible from above. If the furnace is operated with a slag residue near the wall, a normal slag overflow can be utilized. If the furnace is operated with a slag cover in the center, the slag may be removed from the crucible by means of grippers or suction tubes.

Vertical adjustability of the pipe representing the separating device is of particular importance during discontinuous furnace operation. In this type of operation the furnace is only half-emptied with each tapping. Therefore, it is necessary to maintain operating conditions even when the furnace is half empty, by lowering the separating device to the proper level when starting the new furnace operation and by raising it accordingly with increasing furnace contents.

DESCRIPTION OF THE DRAWING

The invention is described in the example shown schematically on the drawing.

1 stands for an induction crucible furnace where coils or inductors 2 produce a magnetic field travelling upward. The smelt therefore rises near the crucible wall in the area indicated by 4, while a descending current is produced in the center 3 of the crucible. Near the bath surface the smelt flows radially towards the center, and in opposite direction near the floor. Pipe 6 of ceramic material is provided in the area of the bath surface as well as an annular, conically tapered discharge hopper 7 for iron sponge 8 to be smelted. The iron sponge charged through hopper 7 is carried from the area of bath surface 9 by the current directed radially towards the center, whereby the intensity of the inward flowing current is still heightened by the fact that the walls of the furnace vessel near its upper opening are conically tapered up- and inward at 12. The iron sponge carried down in the center of the bath is smelted in the process, whereby slag rises against the direction of the current.

Consequently, slag cover 10 collects in the area surrounded by pipe 6. During continuous furnace operation the slag can be removed from pipe 6, e.g. by means of gripper or a suction pipe, as indicated by the arrow 11.

The liquid iron can be tapped below, continuously or discontinuously, as the case may be, whereby tapping is regulated with respect to the quantity of the iron taken, by means of a suitable lock 11.

We claim:

1. A method for smelting a metallic material in an induction crucible furnace, characterized by
   (a) introducing charge material adjacent the top surface of an induction crucible furnace;
   (b) heating said charge material to form a hot bath and to reduce said charge material;
   (c) separating the top surface of said bath into a central portion and an outer annular portion so as not to produce a central dome;
   (d) said introducing step being carried out continuously into said annular outer portion;
   (e) while carrying out said heating step, applying an induced magnetic current flowing upwardly along the walls of said furnace to cause an upward flow path in said bath along the walls of said bath, and a downward flow path adjacent the axis of said path;
   (f) said applying step causing a radial inward flow in said bath adjacent the top surface toward the axis of said bath;
   (g) said introducing step causing impact of said introduced charge material with said upward flow path and the movement thereof radially inwardly toward the axis of said bath;
   (h) collecting slag from said bath at the segregated central portion of the surface thereof;
   (i) removing slag from said segregated central portion; and
   (j) withdrawing said reduced material adjacent the bottom of said furnace as product.

* * * * *